US012045745B2

(12) United States Patent
Navin et al.

(10) Patent No.: US 12,045,745 B2
(45) Date of Patent: *Jul. 23, 2024

(54) BOOKING MANAGEMENT SYSTEM (71) Applicant: Expedia, Inc., Seattle, WA (US)

(72) Inventors: Suguna Navin, Renton, WA (US); Wan-Shuan Cheng, Seattle, WA (US); Abhishek Skariah, Seattle, WA (US); Andrew Lawrence Ebaugh, Seattle, WA (US)

(73) Assignee: Expedia, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,014

(22) Filed: May 12, 2023

(65) Prior Publication Data

US 2023/0281522 A1    Sep. 7, 2023

Related U.S. Application Data (63) Continuation of application No. 16/730,427, filed on Dec. 30, 2019, now Pat. No. 11,651,297.

(51) Int. Cl.
*G06Q 10/02* (2012.01)
*G06Q 20/24* (2012.01)
(Continued)

(52) U.S. Cl.
CPC ............. *G06Q 10/02* (2013.01); *G06Q 20/24* (2013.01); *G06Q 20/354* (2013.01);
(Continued)

(58) Field of Classification Search
CPC ................. G06Q 20/24; G06Q 20/354; G06Q 20/40415; G06Q 20/4018; G06Q 20/407;
(Continued)

(56) References Cited

U.S. PATENT DOCUMENTS

2012/0143770 A1    6/2012  Pauker et al.
2014/0040127 A1    2/2014  Chatterjee et al.
(Continued)

FOREIGN PATENT DOCUMENTS

EP    3915077       12/2021
WO    WO 00/72214   11/2000
(Continued)

OTHER PUBLICATIONS

Extended European Search Report in European Application No. 20910531.1, dated Feb. 16, 2022 in 13 pages.
(Continued)

*Primary Examiner* — Courtney P Jones
(74) *Attorney, Agent, or Firm* — Knobbe, Martens, Olson & Bear, LLP (57) ABSTRACT

A booking management system for secure authentication of payment information and delayed transaction processing is provided. Third-party services partner with booking management systems to aggregate and list offerings of the third-party services in a digestible display on a one-stop platform. A booking management system can manage the authentication of payment card information on behalf of any number of such third-party services. The booking management system may receive a delayed transaction request from one or more such third-party service. The booking management system may provide virtual payment information to the third-party services for delayed transactions. The third-party services may later initiate the delayed transactions using the virtual payment information, without being required to perform authentication processing on the payment card information maintained by the booking management system.

20 Claims, 8 Drawing Sheets (51) Int. Cl.
  *G06Q 20/34* (2012.01)
  *G06Q 20/40* (2012.01)
  *G06Q 20/42* (2012.01)
  *G06Q 50/14* (2012.01)
  *H04L 9/32* (2006.01)
  *G06F 16/23* (2019.01)

(52) U.S. Cl.
  CPC ... *G06Q 20/40145* (2013.01); *G06Q 20/4018* (2013.01); *G06Q 20/407* (2013.01); *G06Q 20/40975* (2013.01); *G06Q 50/14* (2013.01); *H04L 9/3226* (2013.01); *G06F 16/2379* (2019.01); *G06Q 20/425* (2013.01); *G06Q 2220/00* (2013.01)

(58) Field of Classification Search
  CPC ........... G06Q 20/40975; G06Q 20/425; G06Q 10/02; G06Q 50/14; G06Q 2220/00; H04L 9/3226; G06F 16/2379
  USPC .......................................................... 705/75
  See application file for complete search history.

(56) References Cited

U.S. PATENT DOCUMENTS

| | | | |
|---|---|---|---|
| 2014/0172472 A1 | 6/2014 | Florimond et al. | |
| 2015/0161586 A1 | 6/2015 | Bailey | |
| 2015/0161596 A1* | 6/2015 | McCarthy | G06Q 20/02 705/67 |
| 2015/0178712 A1 | 6/2015 | Angrish et al. | |
| 2015/0339661 A1 | 11/2015 | Li et al. | |
| 2015/0348030 A1* | 12/2015 | Cauwenberghs | G06Q 20/24 705/44 |
| 2016/0232527 A1* | 8/2016 | Patterson | G06Q 20/405 |
| 2016/0307186 A1 | 10/2016 | Noe | |
| 2017/0076288 A1 | 3/2017 | Awasthi | |
| 2018/0005228 A1* | 1/2018 | Anderson | G06Q 20/385 |
| 2018/0047019 A1 | 2/2018 | Sullivan | |
| 2018/0082284 A1 | 3/2018 | Gomes | |
| 2019/0228408 A1 | 7/2019 | Singh et al. | |
| 2019/0311361 A1 | 10/2019 | Kumar | |
| 2020/0051084 A1* | 2/2020 | Williamson | G06Q 20/4097 |
| 2020/0175515 A1 | 6/2020 | Radu et al. | |
| 2020/0279242 A1 | 9/2020 | Dahn et al. | |
| 2021/0065170 A1 | 3/2021 | Shriver et al. | |
| 2021/0125164 A1 | 4/2021 | Mehrhoff | |
| 2021/0158333 A1 | 5/2021 | Cohen | |
| 2021/0174352 A1 | 6/2021 | Kenney et al. | |
| 2021/0201210 A1 | 7/2021 | Navin et al. | |
| 2021/0216976 A1 | 7/2021 | Kaufman et al. | |

FOREIGN PATENT DOCUMENTS

| | | |
|---|---|---|
| WO | WO 2006/113834 | 10/2006 |
| WO | WO 2019/155194 | 8/2019 |
| WO | WO 2021/138024 | 7/2021 |

OTHER PUBLICATIONS

International Search Report and Written Opinion for International Application No. PCT/US2020/064488, Notification mailed Apr. 16, 2021.

"PCI DSS Quick Reference Guide: Understanding the Payment Card Industry Data Security Standard version 3.2.1", dated Jul. 31, 2018 in 39 pages, XP055888429, retrieved from: <https://www.pcisecuritystandards.org/documents/PCI_DSS_QRGv3_2_1.pdf?agreement=true&time=1646956069441>.

\* cited by examiner

BOOKING MANAGEMENT SYSTEM

CROSS-REFERENCE TO RELATED APPLICATIONS

The present application is a continuation of U.S. patent application Ser. No. 16/730,427 filed on Dec. 30, 2019, the entirety of which is incorporated by reference herein and made part of this specification.

BACKGROUND

Online travel agencies save users time and energy by consolidating deals from several third-party services onto one convenient web page. Beyond consolidating and displaying third-party service deals, online travel agencies may also handle service bookings and reservations. The process of handling bookings may involve collecting user payment card information and processing payments for the bookings. To date, there are two predominant payment processing models: (1) online payment in full to the online travel agency at time of booking and (2) payment in full to the service upon arrival. In the online payment in full model, the online travel agency collects user payment card information, charges the user payment card in full for the total amount associated with the booking, and either forwards payment to the third-party service or holds some/all of the payment until a later date. In the payment upon arrival model, online travel agencies may or may not collect user payment card information. If an online travel agency does collect user payment card information, it is not charged at the time of booking. Rather, users provide the user payment card information directly to the third-party service at the time of arrival.

BRIEF DESCRIPTION OF THE DRAWINGS

Throughout the drawings, reference numbers may be re-used to indicate correspondence between referenced elements. The following drawings and the associated descriptions are provided to illustrate embodiments of the present disclosure and do not limit the scope of the claims.

DETAILED DESCRIPTION OF ILLUSTRATIVE EMBODIMENTS

Introduction

The present disclosure is related to secure authentication and delayed transaction processing for booking management systems, such as online travel agencies, travel item marketplaces, travel metasearch engines, and the like. Third-party services partner with booking management systems to aggregate and list offerings of the third-party services in a digestible display on a one-stop platform. A booking management system can manage the authentication of payment card information on behalf of any number of such third-party services. The booking management system can maintain and process authentication and authorization data such as authentication cryptograms, authorized transaction IDs, and other such digital verification keys associated with traveler payment cards, and provide virtual payment information to the third-party services for delayed transactions. The third-party services may later initiate the delayed transactions using the virtual payment information, without being required to perform (or re-perform) authentication and authorization processing on the traveler payment card information maintained by the booking management system.

Conventional booking management systems that do not charge users at the time of booking still typically require users to provide payment card information at the time of booking, though the card will not be charged at that time. Instead, the user is asked to provide a physical payment card directly to the third-party service at check-in. In some implementations, only in limited cases such as cancellation or no-show will the payment card information provided at booking be used. In such cases, the payment card information acts as a guarantee for no-shows by the third-party services. One issue with the current method of payment collection is that booking management systems simply pass the payment card information to the third-party service without confirming that the payment card information is valid. This lack of verification means that third-party services are running the risk of receiving incorrect or false payment card information. If there is indeed an issue with the payment card information, the third-party services have no way to recoup any costs, fees, or penalties.

Another issue with the current method of payment card information collection is that certain regulations require some form of authentication before a charge can be made on a payment card. For example, the second Payment Services Directive (PSD2) requires strong customer authentication (SCA) for all payment card transactions linked to banks within the European Economic Area (EEA). Under the current method of payment card information collection, there is no authentication until the payment card actually needs to be charged. This can prove to be difficult in cases of delayed transactions (e.g. no-show or property damage penalties) because third-party services may have trouble getting in touch with customers. At the same time, customers may find text, telephone, or other communications about providing authentication information cumbersome. Furthermore, the acquisition, storage, and use of secure authentication and authorization data (also referred to herein as "authentication information") such as authentication cryptograms, authorized transaction IDs, and other such digital verification keys is non-trivial, and third-party services need specialized technical systems to facilitate the processing of transactions using such authentication information. Such technical requirements can present a major burden on the computing capabilities and other resources of many third-party services. The present disclosure addresses the aforementioned issues, among others.

The presently disclosed booking management system improves existing upfront payment systems and delayed payment systems. Users provide their payment card information at the time of booking, but instead of passing the information to third-party services, the booking management system stores the user card information and determines whether authentication is needed. If so, the booking management system requests authentication from a user card transaction processing system associated with the user card. In some cases, the user card transaction processing system can be a bank that maintains an account linked to the user card. Once the user satisfies various authentication requirements, the user card transaction processing system confirms secure authentication, such as by delivering an authentication cryptogram to the booking management system. The booking management system stores the authentication cryptogram, and a virtual card transaction processing system associated with a financial account of the booking management system generates a virtual card. In some cases, the virtual card transaction processing system can be a bank that maintains an account of the booking management system to be linked to the virtual card. The virtual card information may be forwarded to third-party services either at this time or upon later request for a delayed transaction.

There are several benefits to this system, a few illustrative examples of which are described here. This system allows the booking management system to ensure the payment card information is valid right from the start, thereby reducing the risk of receiving invalid or incorrect card information. Furthermore, this system can increase efficiency because the transaction will not need to be re-authenticated for delayed transactions, since the booking management system would already have the authentication information. Thus, the booking management system can simply charge the user payment card. This system can also improve efficiency by determining which transactions must be authenticated and then only initiating authentication on those qualifying transactions. On the user side, only performing authentications when necessary can also be beneficial. Users for whom there is no requirement for authentication do not need to waste time and energy satisfying security features unnecessarily. Authenticating digital transactions can also improve user security because users will be alerted to transactions on their payment cards.

This system is also easy for third-party services. The third-party service may simply submit a request for a delayed transaction, then the booking management system can charge the user payment card and load the value onto the virtual card. The third-party service may then collect the cancellation penalty from the virtual card. The system also reduces the technical and logistical burden on third-party services. Without the presently-disclosed technology, third-party services need specialized technical systems to facilitate transaction authentication, as well as the technical capacity to store authentication information such as authentication cryptograms, authorized transaction IDs, and other such digital verification keys for each of their transactions.

Under the presently disclosed system, third-party services no longer need to worry about either of these issues because the booking management system can both request the authentication and store the digital verification keys for every transaction.

Further, different methods of authentication are necessary in different transactions (e.g. mandated by government regulation, specified by private entity protocol, etc.). In the case of online transactions, every payment card issuing network can implement their own proprietary protocol solution. Under the disclosed system, third-party services do not need to keep track of constantly-changing technical requirements, advances, and regulations from various entities because the booking management system can determine when authentication is necessary and the type of authentication to be used. This can take some risk away from third-party services, which may not have the resources to keep completely abreast of technical and regulatory developments and therefore may unknowingly use outdated or otherwise undesirable authentication technology and processes. Third-party services can therefore enjoy a consistent, convenient, and reliable system with no extra effort. Finally, having all authentication determinations centralized in the booking management system can also increase efficiency because there is less risk of overlooking inconsistencies.

Although aspects of some embodiments described in the disclosure will focus, for the purpose of illustration, on particular examples of third-party services, transaction processing systems, and authentication procedures, the examples are illustrative only and are not intended to be limiting. In some embodiments, the techniques described herein may be applied to additional or alternative third-party services, transaction processing systems, authentication procedures, and the like. Various aspects of the disclosure will now be described with regard to certain examples and embodiments, which are intended to illustrate but not limit the disclosure.

Booking Management System Network Environment

Figure 1:
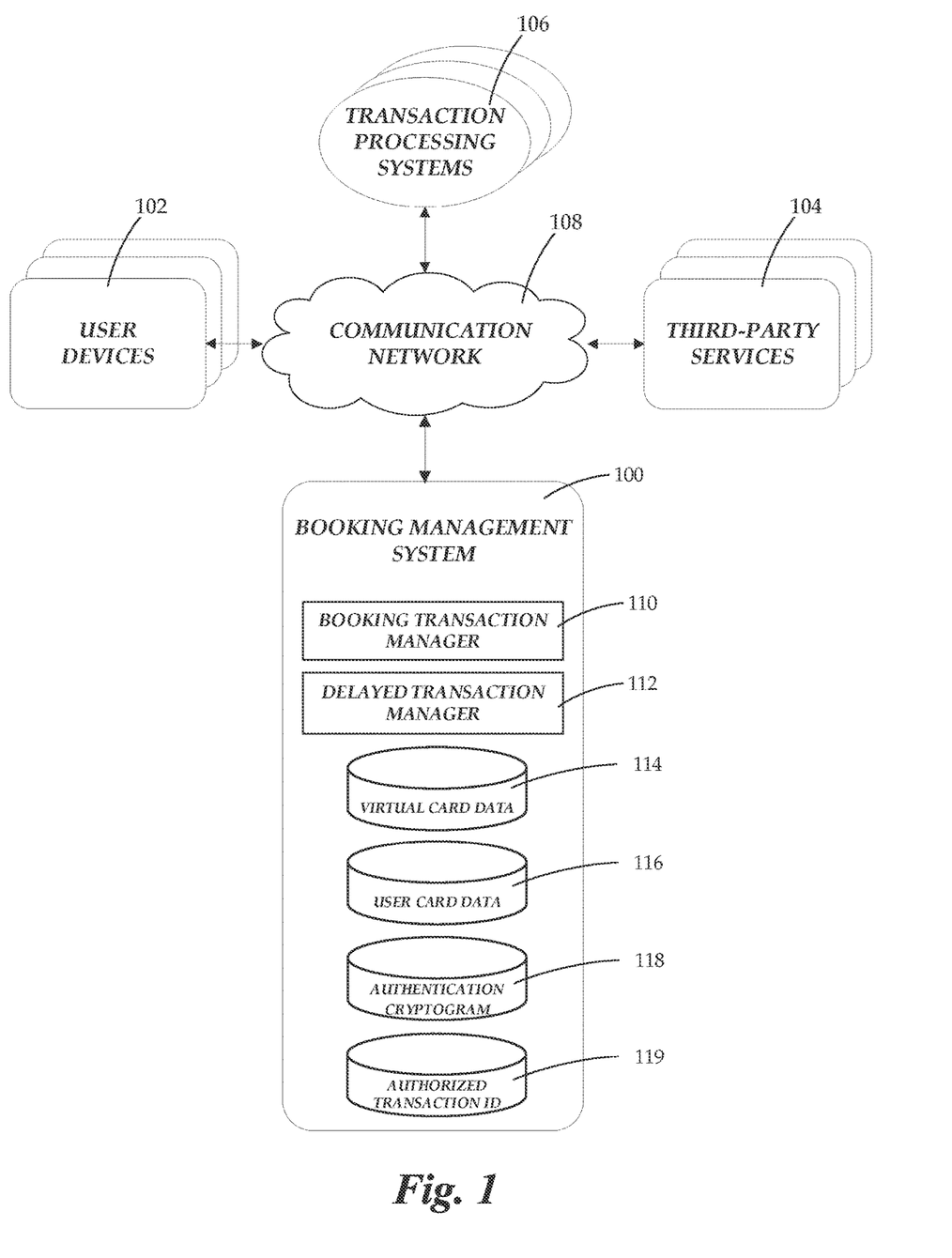
FIG. 1 is a block diagram of an illustrative computing environment including a communication network connecting a booking management system, various end user devices, various third-party services, and various transaction processing systems, according to some embodiments.

With reference to an illustrative embodiment, FIG. 1 shows an example network environment in which aspects of the present disclosure may be implemented. In some embodiments, as shown, the network environment may include a communication network 108 through which a booking management system 100 communicates with user devices 102, transaction processing systems 106, and third-party services 104. In some embodiments, a communication network 108 (also referred to simply as a "network") may be a publicly-accessible network of linked networks, possibly operated by various distinct parties, such as the Internet. In some cases, the network 108 may be or include a private network, personal area network, local area network, wide area network, global area network, cable network, satellite network, cellular data network, etc., or a combination thereof, some or all of which may or may not have access to and/or from the Internet.

The booking management system 100 may include various components to provide booking management services. As shown, the booking management system 100 may include a booking transaction manager 110 and a delayed transaction manager 112. The booking transaction manager 110 may mainly operate at the time of booking. The booking transaction manager 110 may collect user payment information, request authentication of user payment cards, and generate virtual cards. The delayed transaction manager 112 may mainly operate at the time a delayed transaction request is submitted. Delayed transactions can include charges that take place after the booking period and can include, but are not limited to, cancellation penalties, no-show penalties, property damage, and extra service add-on costs. The delayed transaction manager 112 may receive delayed transaction charge requests from third-party services 104, charge user payment cards, and load funds onto virtual cards. The booking management system 100 may also store information related to processing of user payments, including, but not limited to, virtual card data 114, user card data 116, authentication cryptograms 118, and authorized transaction IDs 119 associated with user cards.

The booking management system 100 may be implemented on one or more physical server computing devices. In some embodiments, the booking management system 100 (or individual components thereof, such as the booking transaction manager 110, the delayed transaction manager 112, etc.) may be implemented on one or more host devices, such as blade servers, midrange computing devices, mainframe computers, desktop computers, or any other computing device configured to provide computing services and resources. For example, a single host device may execute one or more booking transaction managers 110, delayed transaction managers 112, some combination thereof, etc. The booking management system 100 may include any number of such hosts. In some embodiments, the features and services provided by the booking management system 100 may be implemented as web services consumable via one or more communication networks. In further embodiments, the booking management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

User computing devices 102—also referred to simply as "user devices" for convenience—may be any computing device configured to request and receive content from the booking management system 100. For example, a user device 102 may include a desktop computing device, a laptop computing device, a tablet computing device, a mobile media player, an electronic reader, a mobile phone configured with network access and program execution capabilities (e.g., a "smart phone"), a wearable computing device configured with network access and program execution capabilities (e.g., a "smart watch" or "smart eyewear"), a television configured with network access and program execution capabilities (e.g., a "smart TV"), a video game console, a set top box, a server computing device, or any other computing device or appliance.

Third-party services 104 may be any service-offering entities that use the booking management system 100 to manage the booking of services offered by the third-party services 104. For example, a third-party service 104 may be a provider of short-term rental property, such as a hotel. As another example, the third-party service 104 may be a provider of transportation, such as a rental car provider or an airline. The example services described herein are illustrative only, and are not intended to be limiting. In some embodiments, a third-party service 104 may offer additional and/or alternative services, combinations thereof, etc. The booking management system 100 may manage some or all booking for any number of such third-party services 104.

The booking management system 100 may collect booking requests and user payment information on behalf of third-party services 104. In the event of a cancellation, no-show, or other reason for a delayed transaction, third-party services 104 can communicate with the booking management system 100 to arrange collection of a penalty after the booked time period as passed.

Third-party services 104 may use one or more physical server computing devices to provide their services and communicate with the booking management system 100. In some embodiments, third-party services 104 may use one or more host devices, such as blade servers, midrange computing devices, mainframe computers, desktop computers, or any other computing device configured to provide computing services and resources. In some embodiments, the features and services provided by third-party services 104 may be implemented as web services consumable via one or more communication networks. In further embodiments, third-party services 104 use one more virtual machines implemented in a cloud computing environment.

Transaction processing systems 106 provide authentication, authorization, and accounting for digital transactions. In some embodiments, a transaction processing system 106 may be any system involved in the processing of digital payment transactions. For example, a transaction processing system 106 may be a bank or other financial institution. Transaction processing systems 106 may be associated with users, or they may be associated with the booking management system 100. Transactions processing systems 106 may process user card authentication requests, charge user cards, and generate virtual cards. Transaction processing systems 106 may also be linked to physical business entities and thus have geographic locations which may be used in determining that user card authentication is required. During user card authentication, transaction processing systems 106 can generate an authentication cryptogram 118. The authentication cryptogram 118 is then sent to the booking management system 100. The transaction processing systems 106 can also generate an authorized transaction ID 119 during an initial user verification transaction, regardless of whether authentication was required. The authorized transaction ID 119 is also sent to the booking management system 100.

To generate an authentication cryptogram 118 in transactions in which a physical user payment card is presented for payment, the transaction processing system 106 could first receive an authorization request cryptogram generated by the user payment card. Authorization request cryptograms can be created by combining segments of data taken from the payment card and the particular transaction. Then, the authorization request cryptogram may be included in an authorization request sent to the transaction processing system 106. The transaction processing system 106 can then generate its own cryptogram using the same payment card and transaction data. If the card-generated cryptogram matches the cryptogram generated by the transaction processing system 106, the transaction processing system 106 may then generate an authentication cryptogram 118 by combining segments of the authorization request cryptogram and the payment card cryptogram key.

Figure 2:
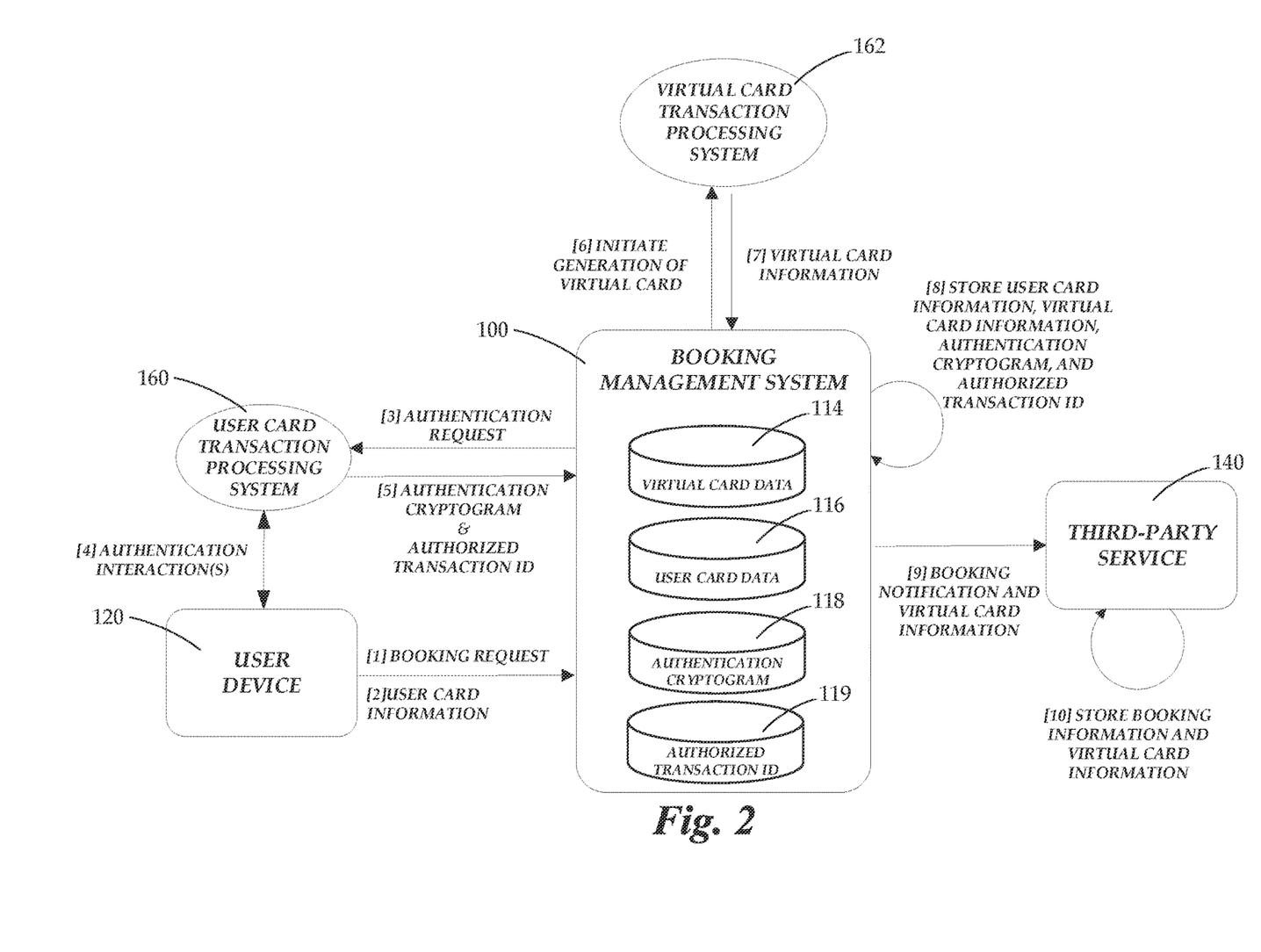
FIG. 2 is a block diagram of various data flows and interactions between the booking management system, an end user device, a third-party service, and various transaction processing systems during a booking request, according to some embodiments.

For online transactions, the authentication process can be started by a user submitting a booking request and payment card information to the booking management system 100. The booking management system 100 or a transaction process system (e.g., the virtual card transaction processing system 162 as shown in FIG. 2) can then send an authentication request to a user card processing system 160. The user card processing system 160 may then send security inquiries directly to the user for authentication. Based on the user's responses, the user card processing system 160 can generate an authentication cryptogram 118. The authentication cryptogram 118 can be generated comprising authentication data in one or more forms, such as, but not limited to, an Account Authentication Value (AAV), an Electronic Commerce Indicator (ECI), or an XID. In some instances, the booking management system 100 may store the same authentication cryptogram 118 in multiple forms. Illustratively, the authentication cryptogram 118 may be an encoded string value taking several bytes of memory (e.g., up to but less than 1 kb of memory) and may vary in accordance with standards set by the card-issuing entity. In some embodiments, the authentication cryptograms 118 are standardized so that they are uniform when stored as tokens in the booking management system 100 servers.

Authentication cryptograms 118 (or tokens representing the authentication cryptograms 118) can then be used to generate authorized transaction IDs 119. When authentication is required, the booking management system 100 can send the authentication cryptogram or corresponding token to the user card transaction processing system 160, which can check the received data to verify that the transaction was authorized by an authenticated user. The user card transaction processing system 160 can then send an authorized transaction ID 119 to the booking management system 100. In situations where authentication is not required, the user card transaction processing system 160 may generate an authorized transaction ID 119 to deliver to the booking management system 100 without requiring an authentication cryptogram or corresponding token. In some embodiments, the authorized transaction ID 119 may be an encoded value taking less than 200 bytes of memory. Authorized transaction IDs 119, such as customer-initiated transaction IDs, can be used as proof of prior user approval for certain types of delayed transactions. As such, authorized transaction IDs 119 may be stored by the booking management system 100 to initiate delayed transactions at a later time.

Transaction processing systems 106 may use one or more physical server computing devices to provide their services and communicate with the booking management system 100. In some embodiments, transaction processing systems 106 may use one or more host devices, such as blade servers, midrange computing devices, mainframe computers, desktop computers, or any other computing device configured to provide computing services and resources. In some embodiments, the features and services provided by transaction processing systems 106 may be implemented as web services consumable via one or more communication networks. In further embodiments, transaction processing systems 106 use one more virtual machines implemented in a cloud computing environment.

FIG. 2 illustrates example interactions and data flows occurring in connection with a booking request, and subsequent generation of a virtual card. As shown, a user device 120 may submit a booking request to the booking management system 100 at [1]. For example, a user may cause the user device 120 to initiate a booking request for a third-party service 140. The user can start the booking request process by accessing a webpage for an online travel agency and searching for a particular travel item. From the list of results, the user can then select the particular travel item which suits their needs. The user can then request a booking for the item from the item's dedicated webpage. The request may be sent to the booking management system 100 via the network 108. Specifically, the request may be received and processed by the booking transaction manager 110. Upon receipt of the booking request, the booking management system 100 may prompt the user to provide user card data 116. At [2], the user can provide user card data 116 to the booking management system 100, also via the network 108. User card data 116 can include, but is not limited to, card number, expiration date, security code, name associated with the card account, etc.

At [3], the booking management system 100 can begin the authentication process by sending an authentication request to the user card transaction processing system 160. When the user card transaction processing system 160 receives the authentication request, it may need to engage one or more security inquiries directly with the user in order to verify the user's identity and the validity of the authentication request. To facilitate the communication between the user and user card transaction processing system 160, the booking management system 100 may display on the user device 120 an embedded or pop-out window that allows the user to interact directly with the user card transaction processing system 160 without leaving the booking management system 100 user interface. In another embodiment, the booking management system 100 may redirect the user away from the booking management system 100 to a webpage where the user can interact directly with the user card transaction processing system 160, and upon completion of the interaction, the user can be redirected back to the booking management system 100.

At [4], the user device 120 and user card transaction processing system 160 may perform an interactive authentication procedure in which it directly communicates with the user device 120 (and/or other devices associated with the user or to which the user otherwise has access) to authenticate the user payment card transaction. As shown, the user card transaction processing system 160 may initiate one or more security inquiries through the user device 120, and the user device 120 may submit responses to the security inquiries to the user card transaction processing system 160. In some embodiments, the security inquiries can satisfy the requirements for strong customer authentication (SCA), which is based on security inquiry responses in two or more of the following categories: knowledge (e.g. password or PIN number), possession (e.g. device access or payment card information), and inherence (e.g. fingerprints, face ID, or other biometric data). The communication between the user card transaction processing system 160 and the user device 120 (and/or other devices) may continue iteratively until the transaction is authenticated or authentication fails. If the authentication is successful, the user card transaction processing system 160 can deliver an authentication cryptogram 118 to the booking management system 100 at [5]. The authentication cryptogram 118 can be an encrypted alphanumeric string created by combining data related to a particular transaction with data related to a particular user or user card. In situations where authentication is not required, the user card transaction processing system 160 can send an authorized transaction ID 119 during this step instead of, or in addition to, the authentication cryptogram 118. When authentication is necessary, the booking management system 100 can store the authentication cryptogram 118 (e.g., in raw form, as a standardized token, etc.). The authentication cryptogram or corresponding token can then be delivered to the user card transaction processing system 160 to verify that the user authorized the transaction. At that point, the user card transaction processing system 160 may generate an authorized transaction ID 119 to send to the booking management system 100.

At [6], the booking management system 100 can begin the virtual card generation process. The virtual card transaction processing system 162 may generate a virtual card with a card number, expiration date, and security code. At this point, the virtual card may be associated with an account which does not hold any value. The virtual card transaction processing system 162 may then send the virtual card data 118 to the booking management system 100 at [7]. The virtual card data 118 can include a card number, expiration date, and security code.

At [8], the booking management system 100 can store the virtual card data 114, user card data 116, authentication cryptogram 118, and authorized transaction ID 119. Although listed as [8] in the figure, this part of the information and data flows can take place at any time after the booking management system 100 first obtains the particular item of data. In some embodiments, the data may be stored on—and accessed from—a separate server or system.

At [9], the booking management system 100 may send the booking notification and virtual card data 114 to the third-party service 140, according to one embodiment. In an alternative embodiment, the virtual card data 114 may not be sent with the booking notification, and instead, may only be sent to third-party services 140 when the virtual card is loaded and ready to be charged. The third-party service 140 may receive a booking notification because the original booking request from the user device 120 can be confirmed once the user card is successfully authenticated. The virtual card may still be associated with an account which does not hold any value and therefore may not be charged.

At [10], the third-party service 140 can store the booking information and virtual card data 114. Although listed as [10] in the figure, this part of the information and data flows can take place at any time after the third-party service 140 first obtains the particular item of data.

Figure 3:
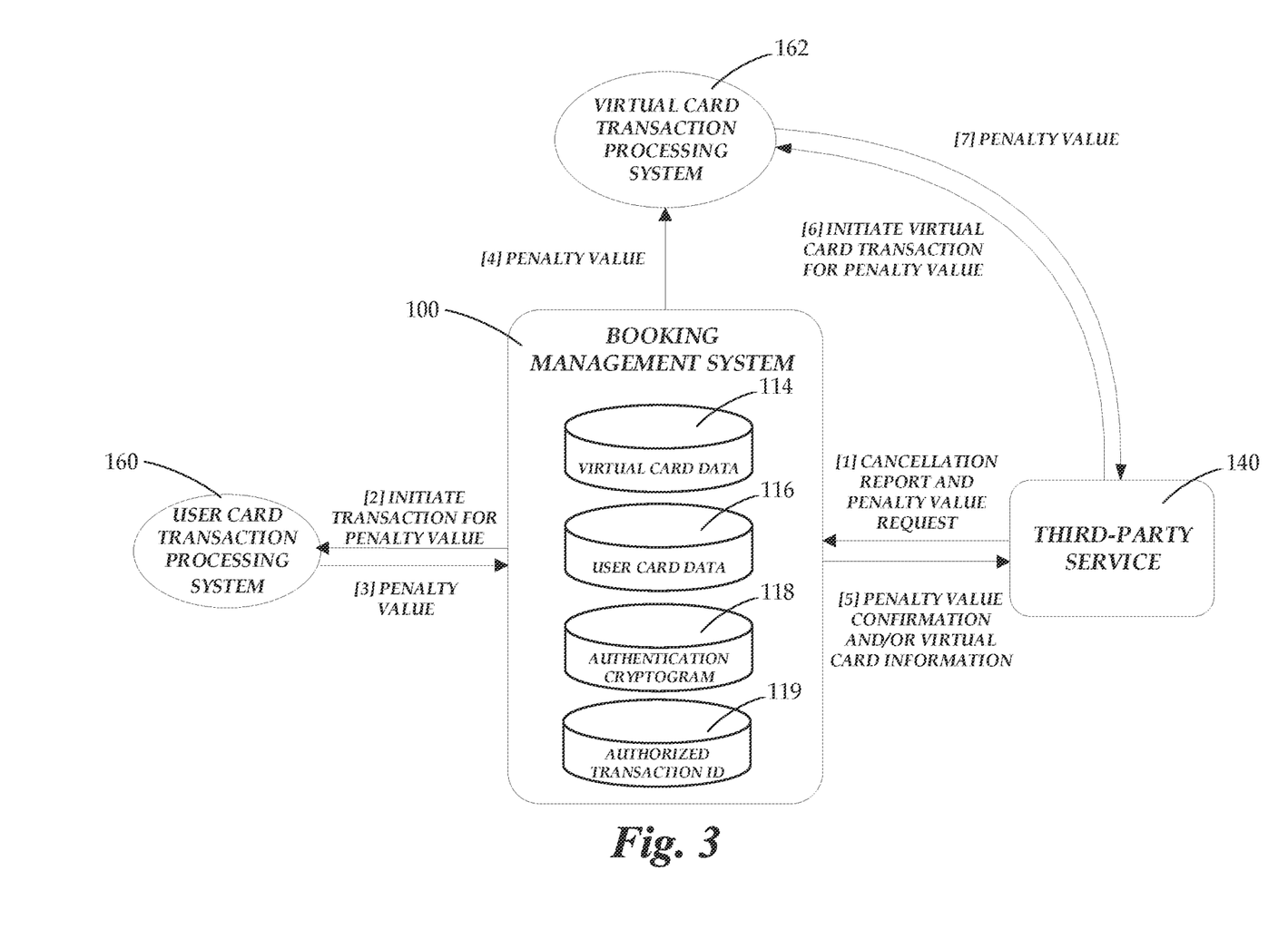
FIG. 3 is a block diagram of various data flows and interactions between the booking management system, a third-party service, and various transaction processing systems during a booking cancellation, according to some embodiments.

FIG. 3 illustrates example interactions and data flows occurring in connection with a delayed transaction request, and subsequent loading and charging of a virtual card. As shown, a third-party service 140 may submit a delayed transaction request to the booking management system 100 at [1]. The request may be sent to the booking management system 100 via the network 108. Specifically, the request may be received and processed by the delayed transaction manager 110. Delayed transactions can include, but are not limited to, cancellation penalties or extra service charges. For example, on the date that a customer was to begin a stay at a short-term rental housing provider, or on the date that the customer was to take possession of a rental vehicle, the customer may not have shown up. As another example, a customer may not have cancelled a booking before a particular deadline (e.g., 1 week in advance of the booking, 1 day in advance of the booking, etc.). These "no-show" or late cancellation events may trigger the charging of a cancellation penalty. The diagram uses the term "penalty value" as an illustrative example of a delayed transaction value that a third-party service 140 can request. In submitting the delayed transaction request, the third-party service 140 may include the amount it would like to be charged to the user.

At [2], the booking management system 100 can initiate a transaction with the user card transaction processing system 160 to collect the delayed transaction amount requested by the third-party service 140. Unlike the authentication transaction depicted in FIG. 2, which can be initiated by the user, the delayed transaction illustrated in FIG. 3 may be initiated by the booking management system 100. The booking management system 100 may communicate with the user card transaction processing system 160 to charge the user payment card. The booking management system 100 may use the user card data 116 and authorized transaction ID 119 that was previously stored during service booking to charge the user payment card. In some embodiments, the authorized transaction ID 119 is used to provide evidence that the user has previously authorized a transaction, and therefore no additional authorization or authentication step is necessary to proceed with the delayed transaction. If the delayed transaction processes successfully, the user card transaction processing system 160 transfers the requested penalty value to the booking management system 100 at [3].

At [4], the booking management system 100 can load the requested penalty value onto the virtual card. The booking management system 100 may load value onto the virtual card by associating the virtual card with an account containing the penalty value. The account can be linked to the virtual card transaction processing system 162.

At [5], the booking management system may communicate with the third-party service 140 to inform the third-party service 140 that the virtual card is ready to be charged. At this time, the booking management system 100 may also transmit the virtual card data 114, if it was not given to the third-party service 140 previously.

At [6], the third-party service 140 may charge the virtual card and redeem the requested penalty value. Since the virtual card may be associated with an account through the virtual card transaction processing system 162, the virtual card transaction processing system 162 can disperse the penalty value to the third-party service 140 at [7].

Example Booking Transaction Management Process

Figure 4:
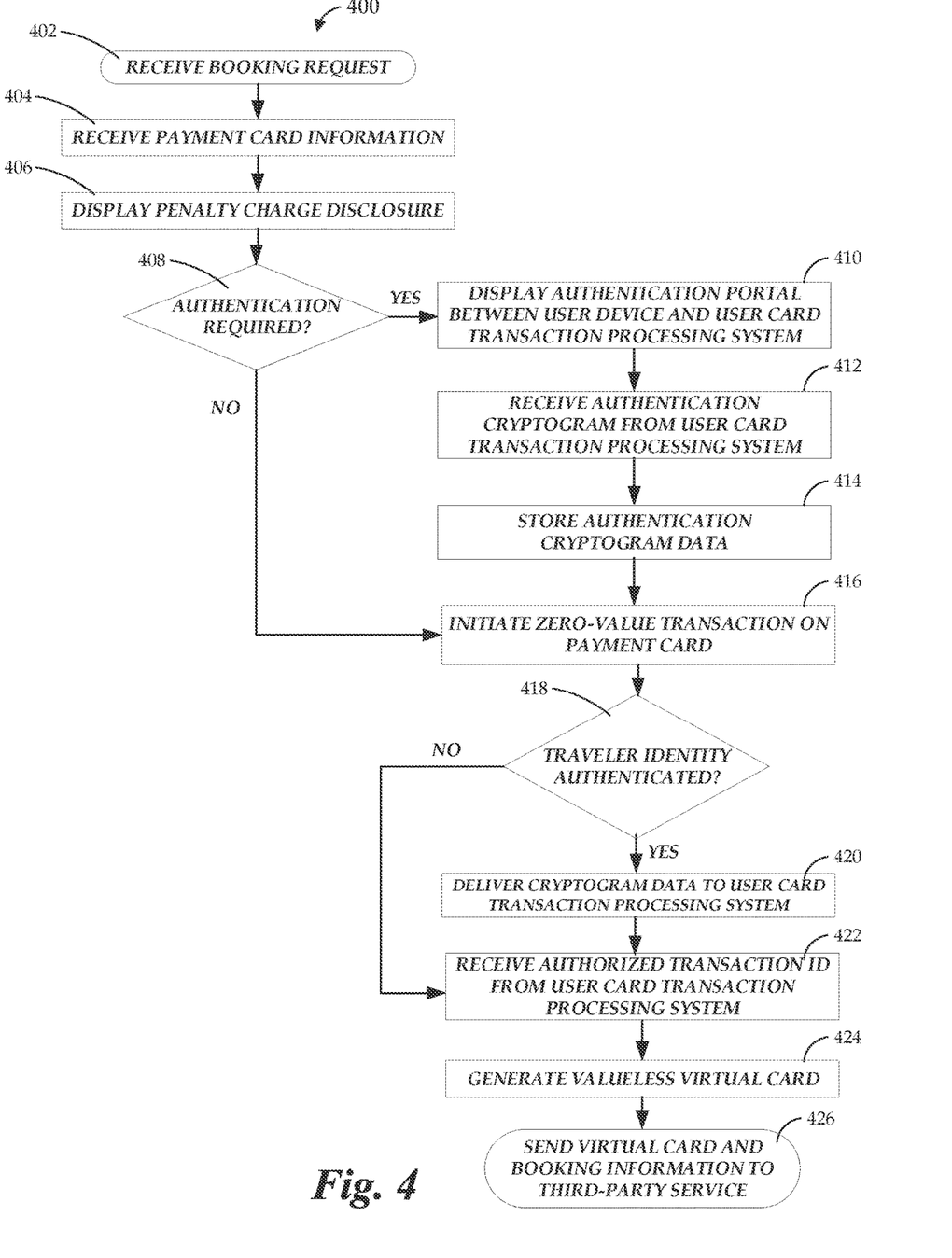
FIG. 4 is a flow diagram of an illustrative process for generating a virtual card at the time of service booking, according to some embodiments.

FIG. 4 is a flow diagram of an illustrative process 400 that may be executed by a booking management system 100 to complete a booking transaction by collecting user payment card information and delivering virtual card data to third-party services. Although each block is listed in a certain sequence in the flow diagram, each of these blocks may occur in a different sequence and may even take place simultaneously. When the process 400 is initiated, a set of executable program instructions stored on one or more non-transitory computer-readable media (e.g., hard drive, flash memory, removable media, etc.) may be loaded into memory, such as random access memory (RAM) of a computing device. For example, booking transaction manager instructions 712 shown in FIG. 7 may be loaded into memory 708 of a computing device 700 and executed by one or more processors 702. In some embodiments, the process 400 or portions thereof may be implemented on multiple processors, serially or in parallel.

The process 400 begins at block 402, where the booking management system 100 may receive a user booking request for third-party services.

At block 404, the booking management system 100 may receive user payment card information. Once the booking management system 100 receives the user payment card information, the booking management system 100 may store the user card data 116. Although no storage step is depicted in the flow diagram, it is to be understood that the booking management system 100 may store information at the time it obtains a piece of data or any time thereafter.

At block 406, the booking management system 100 may display a delayed transaction disclosure on the user device 120. As described above, delayed transactions can include penalty charges. The disclosure may inform users that by providing payment card information, they are consenting to present and delayed transactions executed on the payment card. The delayed transaction disclosure may also include a prospective amount of delayed transaction (e.g., a penalty value) and/or a policy by which the amount may be calculated.

At decision block 408, the booking management system 100 can determine whether authentication is required. The necessity of authentication can vary by situation, depending upon one or more characteristics of the booking request, the transaction processing system 106 associated with a payment card, the third-party service 104 from which a travel item is being booked, or the like. In some embodiments, the booking management system 100 can determine the value of certain characteristics associated with the transaction by: analyzing data regarding the user payment card to determine a geographic location or region of the user card transaction processing system 160; analyzing data regarding the third-party service 104 to determine a geographic location or region of the virtual card transaction processing system 162 associated with the third-party service 104; analyzing data regarding the booking request to determine a date that the booking request is being made, a date or range of dates for which a travel item is being book, etc. The determined values of the relevant characteristics may be analyzed according to a rule to determine whether authentication is to be performed, the type of authentication to perform, etc.

As one example, the second Payment Services Directive (PSD2) requires strong customer authentication (SCA) for all payment card transactions that occur after a particular date and that are linked to banks within the European Economic Area (EEA). In the case of the PSD2, the booking management system 100 may reference the geographic location of the user transaction processing system 160 associated with the user payment card, as well as a geographic location associated with the booking management system 100 (e.g., a geographic location in which the booking management system 100 is located, or a geographic location of a transaction processing system associated with the booking management system 100, such as the virtual card transaction processing system 162 if the virtual card transaction processing system 162 is also processing a transaction with the user transaction processing system 160, etc.) in order to make the determination. If both systems are associated with geographic locations within the EEA, then the booking management system 100 may proceed with authentication. The process 400 may then proceed to block 410. If one or both systems are not in the EEA, then the booking management system 100 may not proceed with authentication as specified under the PSD2. The process 400 may then proceed to block 416, where the booking management system 100 can initiate at zero-value transaction on the user payment card.

At block 410, the booking management system 100 may display an authentication portal on the user device 120 that allows the user device 120 and user transaction processing system 160 to communicate directly. In one embodiment, the portal may be embedded in the booking management system 100 interface such that the user device 120 will not be redirected away from the booking management system 100. In another embodiment, the portal may appear as a pop-out window separate from the booking management system 100 interface. In yet another embodiment, the user may be redirected away from the booking management system 100 to the user transaction processing system 160 and then be redirected back after responding to the necessary security inquiries. The user transaction processing system 160 may communicate directly with a user by sending security inquires to the user device 120. A user may cause the user device 120 to send responses to the security inquiries to the user transaction processing system 160.

At block 412, the booking management system 100 may receive from the user card transaction processing system 160 an authentication cryptogram 118, if the authentication was successful. At block 414, the booking management system 100 may store the authentication cryptogram 118 or information derived therefrom. For example, the booking management system 100 may convert the authentication cryptogram 118 into a token with a standardized format for storage. Although the storage step is disclosed as part of block 414, this disclosure is merely an illustration of a possible arrangement of these steps. In some embodiments, these storing steps can take place at any time once the booking management system 100 obtains a particular item of data or any time thereafter.

At block 416, the booking management system 100 can begin a transaction, such as a zero-value transaction, on the user payment card. The zero-value transaction can produce an authorized transaction ID 119 that serves as confirmation that the transaction is user-initiated and user-authorized. The zero-value transaction can verify the user card information without initiating a transfer of payment. The zero-value transaction can be treated like a usual payment transaction even though no value is actually exchanged. The zero-value transaction can allow the booking management system 100 to begin authentication procedures as would normally be done with a non-zero-value transaction.

At decision block 418, the booking management system 100 can determine whether user card authentication was performed. As described above, the necessity of authentication can vary by situation, depending upon one or more characteristics of the booking request, the transaction processing system 106 associated with a payment card, the third-party service 104 from which a travel item is being booked, or the like. If user card authentication was performed, the process 400 may then proceed to block 420. If the transaction was not authenticated, the process 400 may then proceed to block 422.

At block 420, the booking management system 100 may deliver the stored authentication token to the user card transaction processing system 160. The user card transaction processing system 160 may verify that the token is genuine. The token can serve as proof that the zero-value transaction was user-initiated and that the user, in approving the transaction, also consented to certain delayed transactions. Once the authenticity of the token is verified, the user card transaction processing system 160 can generate an authorized transaction ID 119.

At block 422, the booking management system 100 may receive an authorized transaction ID 119 from the user card transaction processing system 160. The booking management system 100 may then store the authorized transaction ID 119.

At block 424, the virtual card transaction processing system 162 can generate a virtual card. The virtual card data 118 may also be stored by the booking management system 100. The virtual card data 118 can include a virtual card number, a security code, and an expiration date. At the time of generation, the virtual card may be associated with an account carrying no value and therefore may not be chargeable. Once the virtual card is generated, the booking request can be confirmed.

At block 426, the booking management system 100 can send the virtual card data 118 and booking information to a third-party service 104. The virtual card may, at this point, still be associated with an account carrying no value and therefore not chargeable. Along with the virtual card data 118 and booking information, the booking management system 100 may also deliver a message informing the third-party service 104 that the virtual card does not carry any value yet and that the third-party service 104 may submit a delayed transaction request to begin the process illustrated in FIG. 5 of associating the virtual card to an account carrying value.

Example Delayed Transaction Management Process

Figure 5:
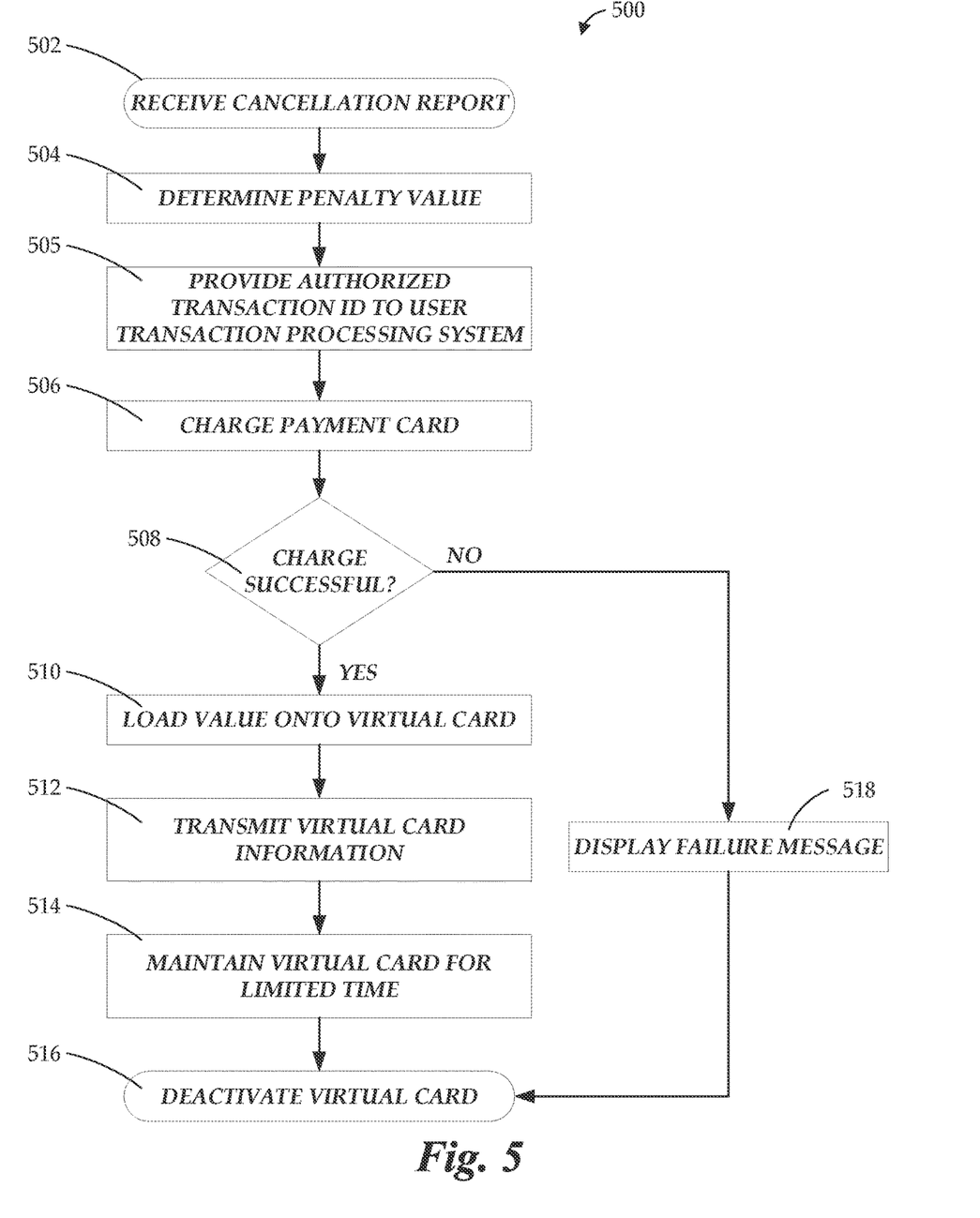
FIG. 5 is a flow diagram of an illustrative process for preparing a virtual card at the time of booking cancellation, according to some embodiments.

FIG. 5 is a flow diagram of an illustrative process 500 that may be executed by a booking management system 100 to respond to a third-party service delayed transaction request by loading value onto a virtual card and transmitting the virtual card information to a third-party service. Although each block is listed in a certain sequence in the flow diagram, each of these blocks may occur in a different sequence and may even take place simultaneously. When the process 500 is initiated, a set of executable program instructions stored on one or more non-transitory computer-readable media (e.g., hard drive, flash memory, removable media, etc.) may be loaded into memory (e.g., RAM) of a computing device. For example, delayed transaction manager instructions 714 shown in FIG. 7 may be loaded into memory 708 of a computing device 700 and executed by one or more processors 702. In some embodiments, the process 500 or portions thereof may be implemented on multiple processors, serially or in parallel.

The process 500 begins at block 502, where the booking management system 100 may receive a delayed transaction request, such as a cancellation report, from the third-party service 140. A part of the cancellation report may include specifying a penalty fee to be charged to the user. At block 504, the booking management system 100 may determine the penalty value.

At block 505, the booking management system 100 can send the authorized transaction ID 119 to the user card transaction processing system 160 such that, at block 506, the booking management system 100 can charge the user payment card. Delayed transactions may not be re-authorized or re-authenticated. With respect to authorization, the booking management system 100 may be permitted to conduct delayed transactions as long as the user had previously authorized the booking management system 100 to charge a user payment card, and the booking management system 100 stored the authorization. With respect to authentication, any required authentication would have been performed in connection with the previous user-initiated transaction. Prior user authorization (and, implicitly, prior authentication if needed) can be shown in the form of an authorized transaction ID 119. To charge the user payment card, then, the booking management system 100 may not require re-authentication, re-authorization, or re-collection of the user card data 116 because the booking management system 100 can access the user card data 116, and authorized transaction ID 119 (and/or other authentication information) that was stored during process 400 described above.

At decision block 508, the booking management system 100 can determine whether the user payment card charge was successful. If the charge is successful, then the booking management system 100 may proceed to load the value onto a virtual card. The process 500 may then proceed to block 510. If the charge is not successful, the booking management system 100 can communicate a failure message informing the third-party service 104 that the charge failed. The process 500 may then proceed to block 518. After notifying the third-party service 104 that the user payment card could not be charged, the booking management system 100 may deactivate the virtual card. The process 500 may then proceed from block 518 to block 516.

At block 510, the booking management system 100 may load value onto the virtual card. The booking management system 100 may load value onto the virtual card by associating the virtual card with an account containing the value charged from the user payment card. The value charged from the user payment card may be the delayed transaction amount that the third-party service 104 requested.

At block 512, the booking management system 100 can transmit the virtual card data 114 to the third-party service 140. The virtual card data 114 can include a virtual card number, an expiration date, a security code, and the value associated with the virtual card. Along with the virtual card data 114, the booking management system 100 can also transmit a message to inform the third-party service 104 that the virtual card can now be charged.

At block 514, the booking management system 100 optionally maintains the loaded virtual card for a limited period of time (e.g., at most one year). Because virtual cards can be maintained for a period of time, third-party services 104 may not be rushed to charge the virtual card and do no risk losing the ability to collect their requested delayed transaction amount. The same virtual card can also have more value added if the third-party service discovers a need for more delayed transactions. At the end of the limited period, the booking management system 100 deactivates the virtual card, at block 516.

Figure 6A:
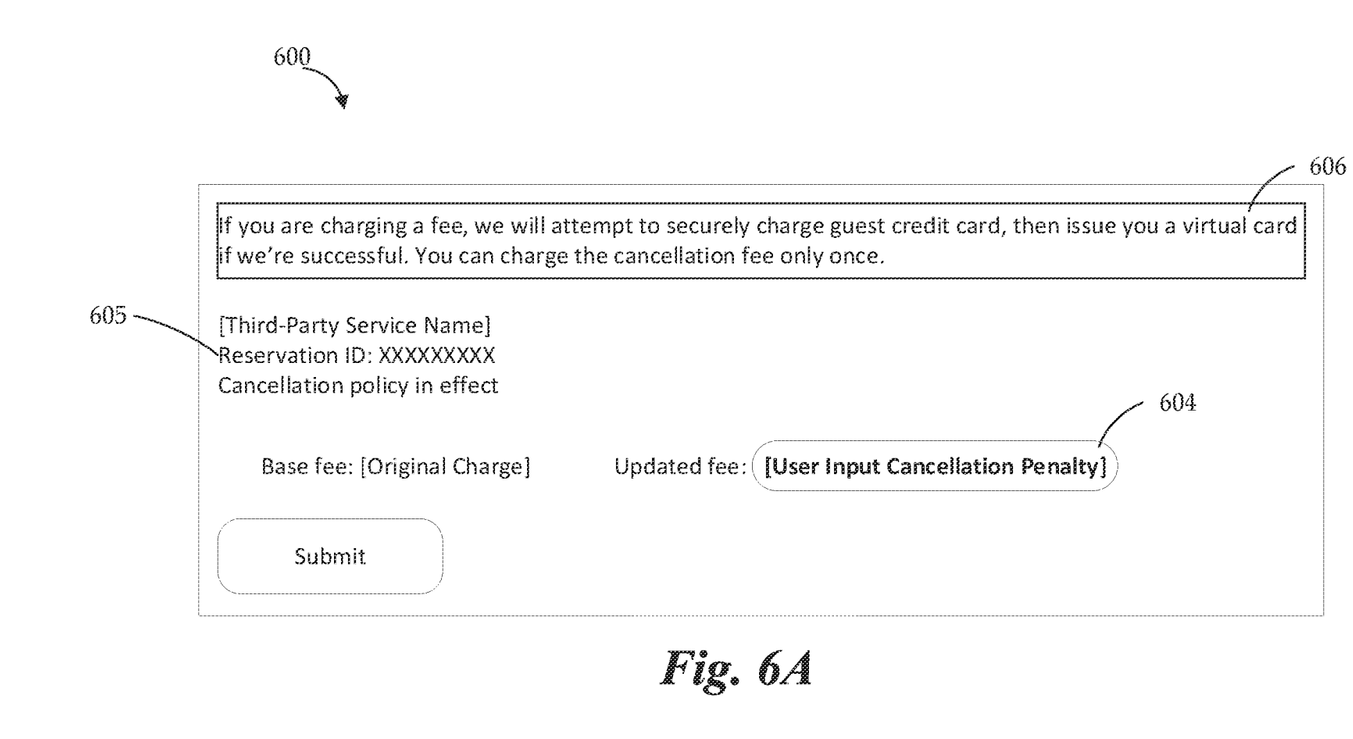
FIG. 6A is a user interface diagram of an illustrative interface for third-party services to submit cancellation penalty charge requests, according to some embodiments.

FIG. 6A illustrates an example of a delayed transaction request interface 600. The delayed transaction request interface 600 can be a user interface accessible to third-party services 104 through which the third-party services 104 can request a delayed transaction. The delayed transaction request interface 600 has a fee input space 604 where third-party services 104 can submit to the booking management system 100 the amount they would like charged to the user. The delayed transaction request interface 600 can also show some basic information, such as booking details 605 for the reservation for which the third-party service 104 is requesting a delayed transaction. The delayed transaction request interface 600 can also display a brief message 606 explaining the process of charging the user payment card then providing the third-party service 104 the virtual card data 114.

Figure 6B:
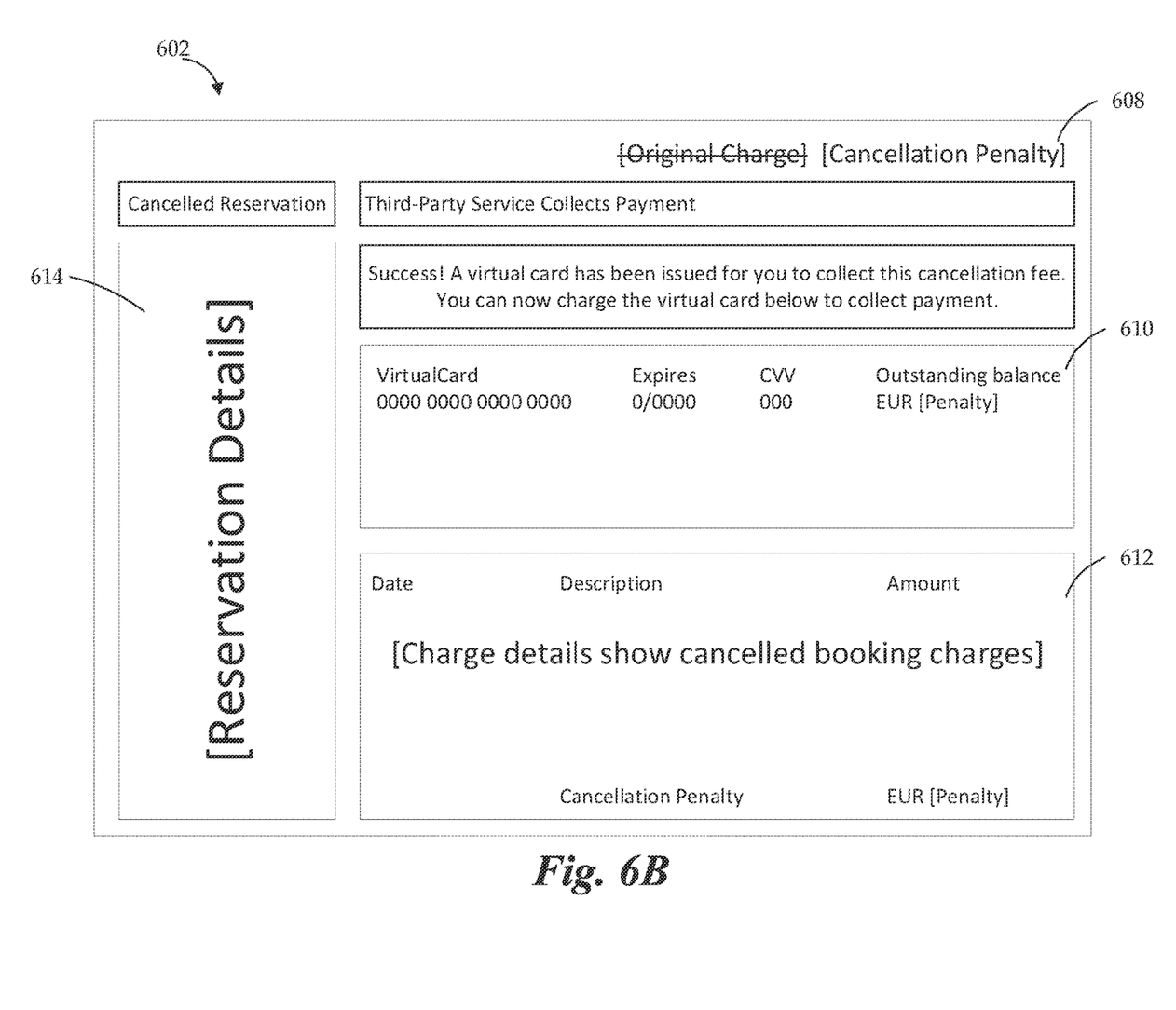
FIG. 6B is a user interface diagram of an illustrative interface displaying virtual card information for third-party services to charge, according to some embodiments.

FIG. 6B illustrates an example of a virtual card issue interface 602. The virtual card issue interface 602 can be a user interface accessible to third-party services 104 through which the booking management system 100 communicates virtual card data 114. The virtual card issue interface 602 may display a cancellation penalty 608 which the third-party service 104 is charging instead of the original booking cost. The virtual card issue interface 602 can also display the charge details 612 as an itemized list, identifying the delayed transaction as any number of fees or penalties (e.g. "cancellation penalty" or "mini bar charge"). The virtual card issue interface 602 can also display booking details 614 for the reservation for which the third-party service 104 requested a delayed transaction. Importantly, the virtual card issue interface 602 may list the virtual card data 610, including, but not limited to, the card number, expiration date, security code, and amount loaded onto the card.

Example Computing System Components

Figure 7:
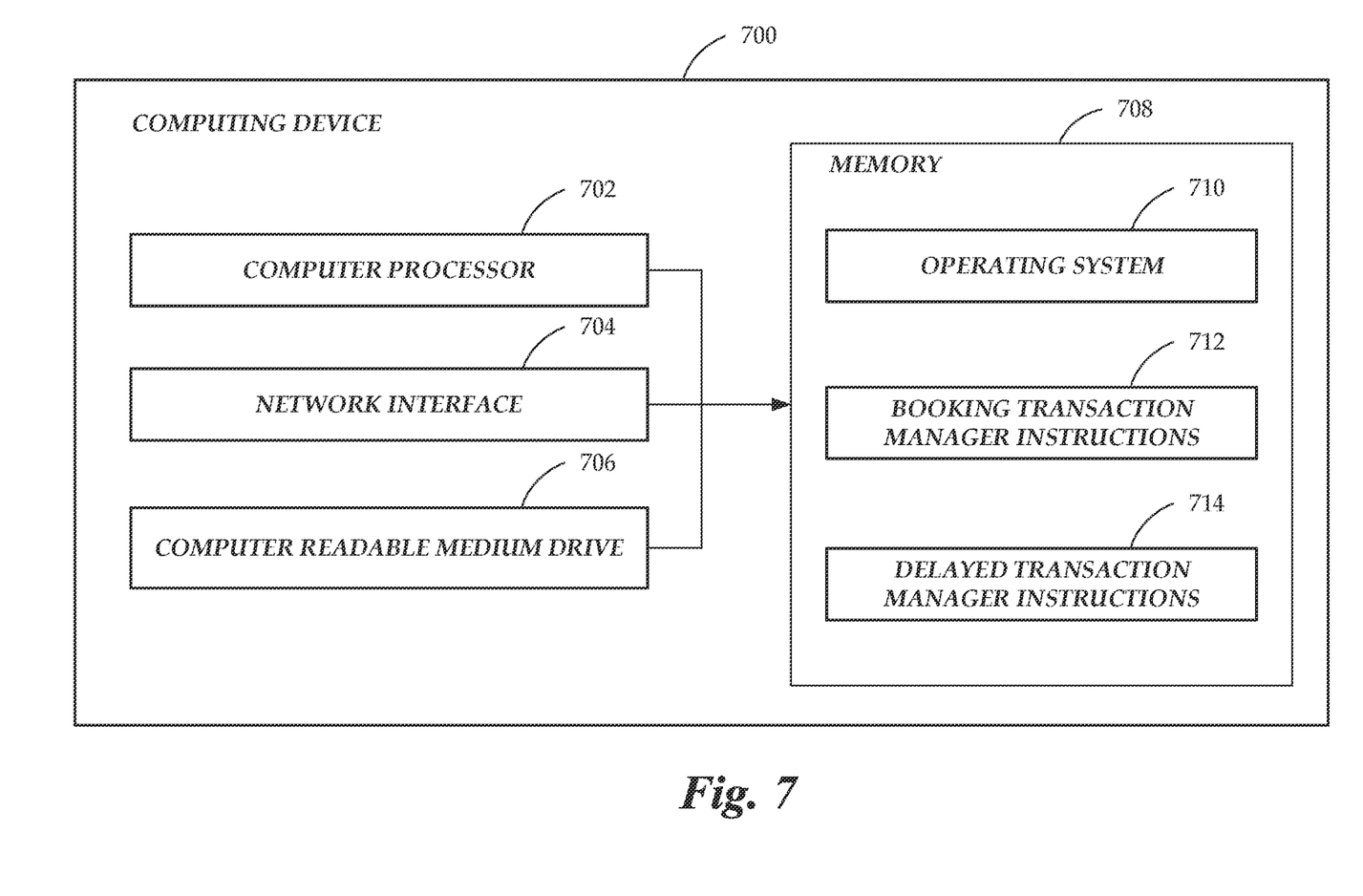
FIG. 7 is a block diagram of an illustrative computing device that may implement one or more of the booking management system features described.

FIG. 7 shows components of an illustrative booking management system computing device 700. In some embodiments, as shown, the computing device 700 may include: one or more computer processors 702, such as physical central processing units (CPUs); one or more network interfaces 704, such as a network interface cards (NICs); one or more computer readable medium drives 706, such as a high density disk (HDDs), solid state drives (SDDs), flash drives, and/or other persistent non-transitory computer-readable media; and one or more computer readable memories 708, such as random access memory (RAM) and/or other volatile non-transitory computer-readable media. The computer readable memory 708 may include computer program instructions that the computer processor 702 executes in order to implement one or more embodiments. For example, the computer readable memory 708 can store an operating system 710 that provides computer program instructions for use by the computer processor 702 in the general administration and operation of the computing device 700. The computer readable memory 708 may also include booking transaction manager instructions 712 for implementing the booking transaction manager 110. The computer readable memory 708 may also include delayed transaction manager instructions 714 for implementing the delayed transaction manager 112.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computer processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A computer processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
under control of a computing system comprising one or more computing devices configured to execute specific instructions,
receiving, from a user device, user card information regarding a user card associated with a first account;
initiating a first transaction with a user card transaction processing system based at least partly on the user card information, wherein the first transaction verifies the user card information without initiating a transfer of payment;
receiving, from the user card transaction processing system, a digital verification key, wherein the digital verification key indicates authorization to make a charge against the user card;
storing the digital verification key on behalf of a third-party service; and
in response to a delayed transaction request from the third-party service:
retrieving the user card information;
initiating a second transaction with the user card transaction processing system based at least partly on the user card information and the digital verification key that had been stored;
sending, to the third-party service, virtual card information regarding a virtual card; and
initiating a third transaction with a virtual card transaction processing system using the virtual card information, wherein the third transaction comprises transfer of a delayed transaction amount from a third account associated with the computing system into a second account associated with the computing system and the virtual card, and wherein the third account, second account, and first account are each different accounts.

2. The computer-implemented method of claim 1, further comprising, in response to the delayed transaction request from the third-party service:
obtaining, from the virtual card transaction processing system, the virtual card information regarding the virtual card associated with the second account associated with the computing system, wherein the second account is associated with a zero balance.

3. The computer-implemented method of claim 1, wherein initiating the first transaction with the user card transaction processing system comprises:
sending the user card information to a transaction processing system associated with the computing system; and
causing the transaction processing system associated with the computing system to send an authentication request to the user card transaction processing system.

4. The computer-implemented method of claim 1 further comprising:
determining the delayed transaction amount based on the delayed transaction request.

5. The computer-implemented method of claim 1, further comprising determining the delayed transaction amount based on policies associated with the third-party service.

6. The computer-implemented method of claim 1, further comprising receiving a value of the delayed transaction amount through a web-based user interface.

7. The computer-implemented method of claim 1, further comprising causing initiation, by the user card transaction processing system, of at least one security measure in connection with the first transaction.

8. The computer-implemented method of claim 7, further comprising determining satisfaction of the at least one security measure for the first transaction based on the digital verification key.

9. The computer-implemented method of claim 1, wherein initiating the second transaction further comprises transferring payment from the first account into the third account.

10. The computer-implemented method of claim 9, wherein transferring payment further comprises transferring the delayed transaction amount from the first account into the third account.

11. A system comprising one or more computer processors programmed by executable instructions to at least:
receive, from a user device, user card information regarding a user card associated with a first account;
initiate a first transaction with a user card transaction processing system based at least partly on the user card information, wherein the first transaction verifies the user card information without initiating a transfer of payment;
receive, from the user card transaction processing system, a digital verification key, wherein the digital verification key indicates authorization to make a charge against the user card;
store the digital verification key on behalf of a third-party service; and
in response to a delayed transaction request from the third-party service:
retrieve the user card information;
initiate a second transaction with the user card transaction processing system, based at least partly on the user card information and the digital verification key that had been stored;
send, to the third-party service, virtual card information regarding a virtual card; and
initiate a third transaction with a virtual card transaction processing system using the virtual card information, wherein the third transaction comprises transfer of a delayed transaction amount from a third account associated with the system into a second account associated with the system and the virtual card, and wherein the third account, second account, and first account are each different accounts.

12. The system of claim 11, wherein the one or more computer processors are further programmed by the executable instructions to, in response to the delayed transaction request from the third-party service:

obtain, from the virtual card transaction processing system, the virtual card information regarding the virtual card associated with the second account associated with the system, wherein the second account is associated with a zero balance.

13. The system of claim 11, wherein the digital verification key is authorization data used to facilitate secure processing of transactions with the user card transaction processing system, and wherein the digital verification key allows the user card transaction processing system to process a transaction without user input.

14. The system of claim 11, wherein the digital verification key is an authentication cryptogram.

15. The system of claim 11, wherein the digital verification key is an authorized transaction identifier.

16. The system of claim 11, wherein the virtual card information comprises a card number, an expiration date, and a security code.

17. The system of claim 11, wherein the one or more computer processors are further programmed by the executable instructions to:

receive, from a user, a booking request associated with the third-party service;

request, from the user, the user card information; and transmit, to the third-party service the booking request.

18. The system of claim 11, wherein the delayed transaction request is received from the third-party service through a user interface comprising a fee input space.

19. The system of claim 11, wherein the second transaction further comprises transferring payment from the first account into the third account.

20. The system of claim 19, wherein the payment is the delayed transaction amount.

* * * * *